United States Patent [19]

Yang et al.

[11] Patent Number: 5,415,850
[45] Date of Patent: May 16, 1995

[54] PILLARED INTERLAYERED CLAY CATALYSTS FOR THE SELECTIVE REDUCTION OF NITROGEN OXIDES WITH AMMONIA

[75] Inventors: Ralph T. Yang, Williamsville, N.Y.; J. Edward Cichanowicz, Saratoga, Calif.

[73] Assignees: The Research Foundation of State Univeristy of New York, Albany, N.Y.; Electric Power Research Institute, Palo Alto, Calif.

[21] Appl. No.: 22,333

[22] Filed: Feb. 24, 1993

[51] Int. Cl.⁶ .............................................. B01J 8/00
[52] U.S. Cl. .................................................. 423/239.1
[58] Field of Search .................. 423/239, 239 A, 239.1

[56] References Cited

U.S. PATENT DOCUMENTS

| | | | |
|---|---|---|---|
| 4,052,337 | 10/1977 | Nishikawa et al. | 252/455 Z |
| 4,140,654 | 2/1979 | Yoshioka et al. | 423/239 |
| 4,282,115 | 8/1981 | Atsukawa et al. | 252/440 |
| 4,629,712 | 12/1986 | Pinnavaia et al. | 502/63 |
| 4,665,045 | 5/1987 | Pinnavaia et al. | 502/84 |
| 4,719,192 | 1/1988 | Schneider et al. | 502/84 |
| 4,720,476 | 1/1988 | Schneider et al. | 423/239 |
| 4,761,391 | 8/1988 | Occelli | 502/63 |
| 4,774,213 | 9/1988 | Schneider et al. | 502/81 |
| 4,798,813 | 1/1989 | Kato et al. | 502/60 |
| 4,830,840 | 5/1989 | Bhattacharyya | 423/239 |
| 4,891,348 | 1/1990 | Imanari et al. | 502/309 |
| 4,929,586 | 5/1990 | Hegedus et al. | 502/217 |
| 4,952,382 | 8/1990 | vanBroekhoven | 423/244 |
| 5,079,203 | 1/1992 | Pinnavaia et al. | 502/84 |
| 5,085,840 | 2/1992 | Held et al. | 423/212 |
| 5,114,691 | 5/1992 | Pinnavaia et al. | 423/244 |
| 5,116,586 | 5/1992 | Baacke et al. | 423/239 |
| 5,116,587 | 5/1992 | Pinnavaia et al. | 423/244 |
| 5,126,300 | 6/1992 | Pinnavaia et al. | 502/84 |

OTHER PUBLICATIONS

R. T. Yang et al. "Pillared Clays as Superior Catalysts for Selective Catalytic Reduction of NO with $NH_3$" in the Jun. 1992 issue of Ind. Eng. Chem. Res. pp. 1440–1445.

*Primary Examiner*—Michael Lewis
*Assistant Examiner*—Thomas G. Dunn, Jr.
*Attorney, Agent, or Firm*—Robert K. Carpenter

[57] ABSTRACT

Pillared interlayered clay catalysts (PILC) are formed and used in the selective reduction (SCR) of nitrogen oxides ($NO_x$) in exhaust gases in the presence of ammonia. $Cr_2O_3$-PILC, $Fe_2O_3$PILC, $TiO_2$-PILC, $ZrO_2$-PILC and $Al_2O_3$-PILC each have considerable activities in the SCR of NO by $NH_3$. Forming the catalysts in a bimodal pore structure provides increases poison resistance and increases reaction rates. Doping the catalyst with $CeO_2$ and/or $Ce_2O_3$ can promote increased activities. The PILC SCR catalysts do not oxidize $SO_2$ to undesirable $SO_3$ in any detectable amount.

11 Claims, 4 Drawing Sheets

PILLARED INTERLAYERED CLAY CATALYSTS FOR THE SELECTIVE REDUCTION OF NITROGEN OXIDES WITH AMMONIA

BACKGROUND OF THE INVENTION

Field of the Invention

The present invention relates generally to novel catalysts for the removal of nitrogen oxides contained in the exhaust gas streams resulting from fuel combustion, and more particularly, to pillared clay catalysts for the selective catalytic reduction of nitrogen oxides, especially for use with coal fired and heavy oil fired boilers and heating furnaces employing high sulfur fuels.

Description of the Prior Art

Nitrogen oxides ($NO_x$) gases contained in the exhaust gas streams resulting from fuel combustion are a major source of air pollution in the United States. A known method of reducing the level of nitrogen oxide emissions is the catalytic reduction of $NO_x$ with ammonia, leaving nitrogen and water. Selective Catalytic Reduction (SCR) is a commercially important example of this type of method. In SCR, catalysts of different compositions have been used. Common commercial catalysts used include $V_2O_5$ mixed with $WO_3$ and/or $MoO_3$ supported on $TiO_2$. In addition to $V_2O_5$, a large number of other catalysts have activities for the SCR reaction.

Catalyst poisoning is a major factor in the economics of SCR. A significant contributor to catalyst poisoning is apparently the deposition of $As_2O_3$ and other vapor species within the pore structure of the vanadia catalyst. This problem can be reduced by a catalyst construction having a bimodal pore size distribution in the $V_2O_5/TiO_2-SiO_2$ catalyst; one group of pores are on the order of microns (macropores) and the other group are on the order of Angstroms (micropores). The poisonous vapor species in the flue gas such as $As_2O_3$ deposit on the walls of the macropores due to their low diffusivities. Since the macropores serve as feeder pores to the micropores, they provide the function as filters of poisons.

Ammonia based selective catalytic reduction (SCR) has been applied extensively in Japan and Western Europe to control nitrogen oxides (NOX) from fossil fuel combustion. This technology, initially applied to sulfur free fuels, has been applied in recent years to low sulfur coals such as those from the Ruhr and Saar Valley (Germany). Applications to date in the US have been limited to process industries and electricity generation facilities which use fuels containing little or no sulfur. In fact, vanadium is a known catalyst for making $SO_3$ from $SO_2$. In SCR, $SO_3$ production is undesirable. Therefore the vanadia catalysts are typically limited to use with lower sulfur coals.

The major obstacles to applying SCR extensively in the US utility industry are (1) costs in the form of significant capital requirements, due to a relatively large catalytic reactor which must be installed between the economizer outlet/air heater inlet, and (2) obtaining commercially acceptable catalyst life (at least 4 years on coals with high sulfur and trace element content), and (3) production of trace quantities of $SO_3$ from $SO_2$ in flue gas, which can affect plant thermal efficiency and reliability. The prior art SCR catalysts have not been successful in overcoming these obstacles.

What is needed is a catalyst offering high activity with respect to NO removal and high tolerance for accumulated poisons which would result in lower cost SCR, while generating very little (or preferably none) of the undesirable $SO_3$ in the flue gas. Both domestic and foreign catalyst suppliers have been attempting to develop such improved SCR catalysts for application in the United States.

Separately, research has been conducted in recent years to improving catalysts for hydrocarbon processing. Pillared interlayered clays (PILC), or pillared clays have been identified as potentially improved substrates for hydrocarbon cracking applications. Pillared interlayered clays are two dimensional zeolite-like materials with artificially configured layers that are separated at controlled distances. The PILCs are prepared by exchanging the charge-compensating cations between clay layers with, preferably, large inorganic hydroxycations, which are polymeric or oligomeric hydroxy metal cations formed by hydrolysis of metal oxides or salts. Upon heating, the metal hydroxycations undergo dehydration and dehydroxylation, forming stable metal oxide, or other metal salt, clusters which act as pillars keeping the thin silicate layers separated, creating interlayer space (gallery) of molecular dimensions. In the past, oxides of titanium, zirconium, aluminum, iron, and chromium have been used as "pillars". The characteristic distance separating the individual clay layers, determined by the size of the metal oxide or salt pillar, is important as it defines the size of the PILC intracrystal pores. In principle, any metal oxide or salt that forms polynuclear species upon hydrolysis can be inserted as pillars, and all layered clays of the abundant phyllosilicate family as well as other layered clays can be used as the hosts. Because of its large pores and hydrothermal stability (to 700° C.), the PILC was thought to be a possible replacement for zeolite as a catalyst for fluid catalytic cracking (FCC).

However, the possible use of PILC in FCC has been hindered due to excessive carbon deposition. An additional difficulty was that the pore size can be considerably smaller than the interlayer spacing calculated from X-ray diffraction (XRD). For Zr-PILC, interpillar spacings in the range of 4–8 Angstroms were the limiting pore sizes although XRD results had shown an interlayer spacing of 14.6 Angstroms. Besides FCC, PILC has been studied for catalyzing alcohol dehydration alkylation and other acid catalyzed reactions.

Thus, while the foregoing body of prior art indicates it to be well known to use SCR to control nitrogen oxides from fossil fuel combustion, the provision of a more simple and cost effective catalyst is not contemplated. Nor does the prior art described above teach or suggest using pillared interlayered clays as catalysts for SCR. The foregoing disadvantages are overcome by use of the unique pillared interlayered clay materials as SCR catalysts of the present invention as will be made apparent from the following description thereof. Other advantages of the present invention over the prior art also will be rendered evident.

SUMMARY OF THE INVENTION

To achieve the foregoing and other advantages, the present invention, briefly described, provides five pillared clays (PILC) which have been synthesized and tested for their activities in the selective catalytic reduction (SCR) of nitrogen oxides (NO) by ammonia ($NH_3$) in the temperature range of from 250° C. to 500° C. All five showed considerable activities in the decreasing order from: $Cr_2O_3$-PILC, $Fe_2O_3$-PILC, $TiO_2$-PILC, $ZrO_2$-PILC and $Al_2O_3$-PILC. $Cr_2O_3$-PILC exhibited higher activities than a commercial (VTT) $WO_3$-$V_2O_5/TiO_2$ catalyst, but its activity was severely decreased by the presence of $SO_2$. $Fe_2O_3$-PILC showed activities comparable to that of $V_2O_5/TiO_2$ and was $SO_2$ resistant. Doping with cerium oxide significantly enhanced the activity; for $Fe_2O_3$-PILC, doping with 1.5–2 $CeO_2$ more than doubled its activity and the resulting activity was significantly higher than that of the VTT commercial catalyst (both with and without the presence of $SO_2$ and $H_2O$). The formed PILC catalysts preferably have a bimodal pore structure, with which a superior poison resistance has been demonstrated in SCR operations using the prior art $V_2O_5$ based catalyst. Thus, the high activities and the potential poison resistance make pillared clays an excellent new class of catalysts for SCR applications. Furthermore, the pillared clays do not appear to oxidize $SO_2$ to undesirable $SO_3$ in any detectable amount.

A potential major advantage of pillared clays for SCR application is their resistance to poisoning. Catalyst poisoning is a major factor in the costs of SCR. A significant contributor to catalyst poisoning is apparently the deposition of $As_2O_3$ and other vapor species within the pore structure of the prior art vanadia catalysts. This problem can be overcome by using a catalyst structure having a bimodal pore size distribution in the PILC catalyst of the present invention; one group of pores are of the order of microns (macropores) and the other group are of the order of Angstroms (micropores). The poisonous vapor species in the flue gas such as $As_2O_3$ deposit on the walls of the macropores due to their low diffusivities. Since the macropores serve as feeder pores to the micropores, they provide the function as filters of poisons. The pore structure of catalysts made of pillared clays in accordance with the present invention should be bimodal. The commercially available clays such as montmorillonite (or washcoat) PILC catalyst will contain feeder (or poison filter) pores in the interparticle spaces, whereas the intraparticle micropores contain the active catalyst surface for the SCR reaction.

The above brief description sets forth rather broadly several of the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the more preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for constructing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore the primary object of the present invention to provide catalysts for the SCR of nitrogen oxides in exhaust gases which overcomes the deficiencies, disadvantages and limitations of the prior art.

It is another object of the present invention to provide a catalyst for the selective catalytic reduction of nitrogen oxides with ammonia having a long catalytic activity life.

It is still another object of the present invention to provide a process for the selective catalytic reduction of nitrogen oxides utilizing a catalyst capable of performing continuously over a long period of time.

It is yet another object of the present invention to provide catalysts for the SCR of nitrogen oxides which are more cost efficient and less expensive to manufacture and use than those of the prior art.

It is a further objective of the present invention to provide catalysts for SCR of nitrogen oxides offering greater poison resistance than those of the prior art.

It is yet even a further object of the present invention to provide catalysts for SCR of nitrogen oxides which does not oxidize $SO_2$ to undesirable $SO_3$.

It is yet still another object of the present invention to provide catalysts for SCR of nitrogen oxides which removes harmful trace elements such as arsenic and mercury.

An even further object of the present invention is to provide catalysts for SCR of nitrogen oxides having a bimodal pore system to provide greater activity surface area and greater poison resistance.

Still a further object of the present invention is to provide catalysts for SCR of nitrogen oxides which can be utilized in coal fired and heavy oil fired boilers and heating furnaces employing high sulfur fuels.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects and advantages other than those set forth above will become more apparent after a study of the following detailed description thereof. Such description makes reference to the annexed drawings of which.

DESCRIPTION OF THE PREFERRED EMBODIMENT

Figure 1:
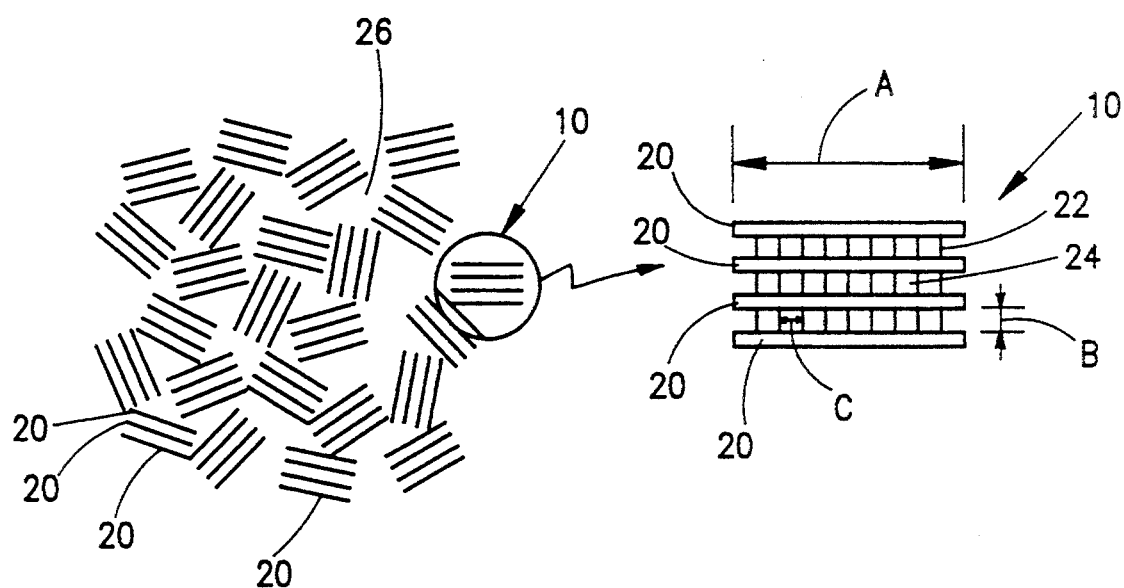
FIG. 1 is a perspective view showing the bimodal pore size distribution of pillared clay materials in accordance with the present invention.

The present invention provides superior catalysts for the selective catalytic reduction (SCR) of nitrogen oxides ($NO_x$) in the form of pillared interlayered clays or pillared clays (PILC) and methods for their production.

The PILCs are prepared by exchanging the charge-compensating cations between clay layers with, preferably large, inorganic hydroxycations, which are polymeric or oligomeric hydroxy metal cations formed by hydrolysis of metal oxides or salts. Upon heating to between 100° C. and 500° C., the metal hydroxycations undergo dehydration and dehydroxylation, forming stable metal oxide, or other metal salt, clusters which act as pillars keeping the thin silicate layers separated, creating interlayer space (gallery) of molecular dimensions. For the present invention, oxides of titanium, zirconium, aluminum, iron, and chromium can be used as the "pillars". The characteristic distance separating the individual clay layers (determined by the size of the metal oxide or salt pillar) is important as it defines the size of the PILC intracrystal pores. In principle, any metal oxide or salt that forms polynuclear species upon hydrolysis can be inserted as pillars, and all layered clays of the abundant phyllosilicate family as well as other layered clays, including but not limited to pyrophillates and talcs can be used as the hosts in the present invention.

Five pillared clays have been found to have considerable activities for SCR of $NO_x$ with ammonia. These five PILCs are $Cr_2O_3$-PILC, $Fe_2O_3$-PILC, $TiO_2$-PILC, $ZrO_2$-PILC and $Al_2O_3$-PILC. These five can be used as catalysts for SCR alone or in combination with each other, and/or in combination with other materials (or dopants)

The most preferred embodiment of the present invention is an SCR catalyst made of a delaminated $Fe_2O_3$-pillared clay ($Fe_2O_3$-PILC). The delaminated $Fe_2O_3$-PILC can be doped with cesium oxide since cesium oxide increases the SCR activity of the delaminated $Fe_2O_3$-PILC slightly. However, since the cesium oxide is relatively expensive, it may not be cost effective to dope the delaminated $Fe_2O_3$-PILC in all cases.

Alternative preferred embodiments of SCR catalysts of the present invention are 1) non delaminated $Fe_2O_3$-pillared clay and 2) $TiO_2$-pillared clay doped with $Fe_2O_3$ and $Cr_2O_3$. The alternative preferred embodiments pillared clays of the present invention are preferably doped with $CeO_2$ and/or $Ce_2O_3$, preferably in an amount between approximately 0.1 and 10 wt % and more preferably approximately 3 wt %. Other dopants which can be added in alternative embodiments of the present invention to increase the effectiveness of the catalysts of the present invention are $MoO_3$, and/or $V_2O_5$ and/or $WO_3$, preferably in an amount of from 0.1 to 10 wt %.

The present invention takes advantage of the bimodal pore size distribution created by the use of the PILC material and the washcoating process, both of which increase the rate of reaction per unit volume of catalyst and also increase the resistance to accumulation of catalyst poisons. The increase in reaction rates significantly reduces the catalyst size necessary as well as increases the tolerance to poisoning species thus increasing catalyst life. PILCs do not appear to produce undesirable $SO_3$ from $SO_2$, as highly active catalysts based on transition metal oxides other than $V_2O_5$ can be used.

The catalyst of the present invention can be used for SCR of nitrogen oxides at effective operating temperatures of between 200° and 500° C. The catalysts of the present invention have high surface area for SCR and can be made from relatively inexpensive materials which are commonly available. The catalysts of the present invention provide very low $SO_2$ oxidation rates (less production of undesirable $SO_3$ compared to the prior art commercial catalysts) which is very important for burning high sulfur coals. Also, SCR activities twice that of the prior art commercial catalysts are possible using the preferred embodiment PILC catalyst of the present invention.

Referring now to FIG. 1, the left hand part of the figure shows a plurality of PILC crystals 10 in the bimodal pore structure of the present invention. The two characteristic dimensions of PILC: [1] the intracrystal dimension (reference letter B and reference letter C in the figure) which is the spacing between parallel clay layers 20 and [2] the intercrystal dimension (the dimension of the intercrystal pores 26) which is the spacing between washcoated crystals, can be controlled and optimized to maximize catalyst performance. The clay layers 20 are typically and preferably approximately $2\mu$ in length. The clay layers 20 are separated by pillars 22. The intracrystal pores 24 are formed between the layers 20 and the pillars 22. Catalytic sites for SCR are created at the intracrystal pores 24, which are typically and preferably several angstroms (preferably approximately 3–12 Å, shown by dimension reference letters B and C in FIG. 1) in size. The intercrystal pores 26 are relatively large void spaces, created by random stacking of individual PILC crystals 10. The intercrystal pores 26 have characteristic sizes typically and preferably on the order of the crystal sizes, i.e. microns.

The PILC washcoat creates a flowpath for the $NO/NH_3/O_2$ reactants, that feed first through the large micron size pores 26 for subsequent diffusion through the angstrom sized pores 24 between the clay layers 20. This pore structure increases the surface area available for reaction, as well as the opportunity to condense vapor phase poisons while retaining sufficient surface area for reaction. Harmful trace elements such as arsenic and mercury can be removed using the PILC SCR catalysts of the present invention.

The present invention catalyst can be applied to any fossil fuel fired boiler. It is anticipated that the benefits will be greatest for use in coal fired and heavy oil fired boilers and heating furnaces, which employ fuels with high sulfur that offer the greatest potential for catalyst deactivation and production of harmful and undesirable byproduct $SO_3$. Thus, the filtering effect of the pores created by intercrystal spacing provides the important benefit for this application in sulfur containing fuel.

The catalysts of the present invention have the following advantages: 1) long catalyst life; 2) high rate of reaction per unit volume of catalyst for reducing nitrogen oxides with ammonia; 3) high resistance to the accumulation of catalyst poisons; 4) low costs of construction, installation and operation; and 5) very little or no production of undesirable $SO_3$. The following examples will serve to more fully explain the practice of the present invention. However, it is understood that these are only examples and in no way are intended to limit the scope and coverage of the present invention.

EXAMPLES

Five pillared clays were initially synthesized and tested for their activities in the selective catalytic reduction of $NO_x$ by ammonia ($NH_3$) in the temperature range 250°–500° C. The five PILCs synthesized were $Cr_2O_3$-PILC, $Fe_2O_3$-PILC, $TiO_2$-PILC, $ZrO_2$-PILC and $Al_2O_3$-PILC.

The reactor used was a quartz tube. The heating element was a coiled Nichrome wire. The reactor temperature was controlled by an Omega CN-2010 programmable temperature controller. The catalyst, usually around 2 ml in volume, was supported on a fritted support. The inside diameter of the reactor was 2 cm.

Two sets of flow meters were employed for blending a synthetic flue gas. Rotameters were used to control flows with high flow rates (i.e., $N_2$, $NH_3+N_2$ and $NO+N_2$). Mass flow meters (FM 4575, Linde Division) were used for gases with low flow rates ($SO_2$ and $O_2$). The premixed gases (0.8% NO in $N_2$ and 0.8% $NH_3$ in $N_2$) were supplied by Linde. The 8% water vapor was generated by passing nitrogen gas through a heated gas-wash bottle containing distilled water. To prevent the deposition of ammonium sulfate, the tubings were heated by heating tapes. NO concentration was continuously monitored by a chemiluminescent $NO/NO_x$ analyzer (Thermo Electron Corporation, Model 10). To avoid any analytical error caused by oxidation of ammonia in the converter of the $NO/NO_x$ analyzer, an ammonia trap (phosphoric acid solution) was installed before the sample inlet.

The catalyst activity is expressed as a first order rate constant with respect to NO. This is justified because results on a large number of metal oxides (including Fe, Cr, and V oxides) supported on $TiO_2$ or $Al_2O_3$ have shown the SCR reaction to be first order with respect to NO and zero order with respect to $NH_3$ under similar conditions. Assuming plug flow, the rate constant can be calculated as $$k = -\frac{F_o}{[NO]_o W} \ln(1 - X)$$

where W is the weight of the catalyst, $F_o$ is the inlet molar flow rate of NO, $[NO]_o$ is the inlet molar concentration and X is NO conversion.

Besides the pillared clays of the present invention, $V_2O_5/TiO_2$ and $WO_3$-$V_2O_5/TiO_2$ catalysts were also tested for comparison. These catalysts were prepared by incipient wetness impregnation. The surface areas were both 30 $m^2/g$. The $WO_3$-$V_2O_5/TiO_2$ had the same composition and surface area as a commercial SCR catalyst.

Synthesis of pillared clays (PILC)

The general method for PILC synthesis is given first followed by details for the synthesis of the specific pillared clays used in this invention. The first step in PILC synthesis is preparation and aging of the pillaring solution to form oligomers. The pillaring agent undergoes hydrolysis, polymerization and complexation with anions in the solution. The hydrolysis conditions (temperature, pH and aging time) are important to the formation of PILC.

The next step is intercalation (or ion exchange) of the small cations (e.g. Na+) between the clay layers with the oligomers. This is done by preparing a slurry consisting of a suspension of the clay in deionized and distilled water, oligomeric solution, and HCl and/or NaOH used for pH adjustment. The pH of the clay/water suspension is 9.10 (1 gr clay+100 ml $H_2O$). The equivalent amount of the oligomeric solution is added dropwise to the clay suspension while vigorous stirring is maintained. Slow addition of the solution helps in the formation of uniform pillared clays.

Upon completion of ion exchange/intercalation, the sample is separated from the liquid phase and washed by vacuum filtration or by centrifugation.

The final step is drying/calcination. The method and condition of the drying step can have a strong influence on the porosity of the PILC, as well as the acidities and catalytic properties. In general, the solvent free PILC is stabilized by heat treatment under air or inert gas ($N_2$ or Ar) at a temperature between 150° C. and 450° C.

(a) Zr-PILC synthesis

The starting material for preparation of zirconium pillared clay (Zr-PILC) was a purified montmorillonite, purified-grade bentonite powder from Fisher Company, less or equal to approximately 2 micrometers size. Zirconyl chloride ($ZrOCl_2.8H_2O$) also from Fisher, was the salt to be hydrolyzed and used as the pillaring agent. The oligomeric solution was prepared from $ZrOCl_2.8H_2O$ by dissolving the equivalent amount of the salt in deionized, distilled water to produce 0.1 M solution. This solution was aged at room temperature for 10 days at a pH of 1.3. In the synthesis of Zr-PILC, the pillaring stoichiometry should be at least 2.5 mmole Zr/1 g clay. Typically, 25 $cm^3$ of 0.1 M $ZrOCl_2$ should be used per 1 g of the bentonite clay. The main intercalating species was the tetramer, $Zr_4(OH)_{14}(H_2O)_{10}^{2+}$. However, larger oligomers containing 20 to 40 metal ions were probably also formed. Next the equivalent volume of the oligomeric solution, normally 25 $cm^3$ was added dropwise to the 1-g clay suspension while vigorous stirring was maintained. The pH of the resulting solution was checked, and adjusted to the desired value using 0.1 M HCl or 0.1 NaOH. The adjusted pH of the slurries used in this example were in the range 1.4–8.35. Ion exchange in the slurry took place at 50° C. in a constant temperature bath shaker for a period of 3 days. Upon completion of ion exchange/intercalation, the sample was separated and washed by vacuum filtration. The residue on the filter was washed repeatedly with deionized and distilled water until no chloride ions remained as indicated by no further precipitation with $AgNO_3$ added to the filtrate. Finally, the sample was calcined in air at 350° C. for 24 hours.

(b) Al-PILC Synthesis

The starting clay for the preparation of Al-PILC was the same purified grade of Bentonite powder.

The aluminum hydroxy-oligomeric solution (pillaring solution) was prepared by dissolving the equivalent amount of aluminum chloride ($AlCl_3.6H_2O$) salt in deionized, distilled water to produce 0.1 M $AlCl_3$ solution. Then different amounts of 0.1 M NaOH were added very slowly (20 cm³/hr) to different flasks, each containing 25 cm³ of 0.1 M AlCl₃, to obtain oligomeric solutions having various OH/Al molar ratios between 1.0–2.5. Vigorous stirring was necessary during the addition of NaOH in order to prevent local accumulations of hydroxyl ions, which invariably produced precipitation of Al(OH)₃ in the form of gibbsite.

The oligomeric solution chemistry is quite complex, but is believed to be reasonably well understood. Oligomeric solutions having various OH/Al molar ratios were aged at 25° C. for five days. Once the oligomeric solution was prepared, the next step was intercalation (or ion exchange) of the small cations between the clay layers with the oligomeric cations. Normally the clay slurry consisted of 25 cm³ of oligomeric solution (OH/Al ratio between 1.0–2.5) and a clay suspension (1.0 g clay in 50 cm³ H₂O). The pH of the slurry was in the range of 3.2–5.8. The exchange reaction was conducted at 50° C. in a constant temperature bath shaker for a period of 3 days. The remaining steps (filtration and calcination) were the same as described earlier for the Zr-PILC synthesis.

(c) Fe-PILC synthesis

A 0.2 molar solution of ferric nitrate (Fe(NO₃)₃) was initially prepared. Solid powdered sodium carbonate (Na₂CO₃) was added slowly to the above solution at 25° C. Carbon dioxide was evolved and vigorous stirring was utilized. Hydrolysis of the Fe(NO₃)₃ with the Na₂CO₃ was carried out at 25° C. and for an aging period of 24 hrs. The value of OH/Fe was 2.0 and the pH was 1.8. A clay suspension (1 g of clay + 100 cm³ of H₂O) was then added to the hydrolyzed ferric solution. The clay suspension and the pillaring agent were intermixed for about 24 hours after which the intercalated clay product was separated from the liquid phase by vacuum filtration, and the product was washed and then air-dried at 200° C. for 12 to 14 hours.

(d) Cr-PILC Synthesis

Solutions containing cationic polyoxychromium oligomers were prepared by the hydrolysis of 0.10 M chromium nitrate (Cr(NO₃)₃·9H₂O) at 95° C. using Na₂CO₃ as the base. The OH/Cr ratio was 2 and the hydrolysis time was 36 hrs at a pH of 2.1. To the hot solutions were added 1 wt % suspensions of clay powder. The Cr was in excess during the pillaring reaction (typically 50 mmol/meq of clay). After a reaction time of 16–24 hours, the product was collected by vacuum filtration and washed free of excess salt. The final product was air-dried at 200 degrees for 12 to 14 hours.

(e) Ti-PILC Synthesis

The pillaring agent, consisting of a solution of partially hydrolyzed Ti-polycations, was prepared by first adding TiCl₄ into 6.0 M HCl. This mixture was then diluted by slow addition of distilled water with stirring to reach a final Ti concentration of 0.82 M HCl in amount corresponding to a final concentration of 0.11 M which was used in the preparation. The solutions were aged at room temperature for 2–3 days prior to their use. The pH of the solution was 1.10. Two grams of bentonite were dispersed in 0.5 L of distilled water by prolonged stirring (5 hr). The amount of the pillaring agent required to obtain a Ti/clay ratio of 10 mmole Ti/g clay was then added to the vigorously stirred suspension. The resulting product was left in contact with the solution for 18 hrs and then separated by vacuum filtration and washed with distilled water several times until the liquid phase was free of chloride ions as determined by AgNO₃. The final product was air-dried at 300 degrees Celsius for 12 hours.

RESULTS AND DISCUSSION

Characterization of Pillared Clay Catalysts

Figure 2:
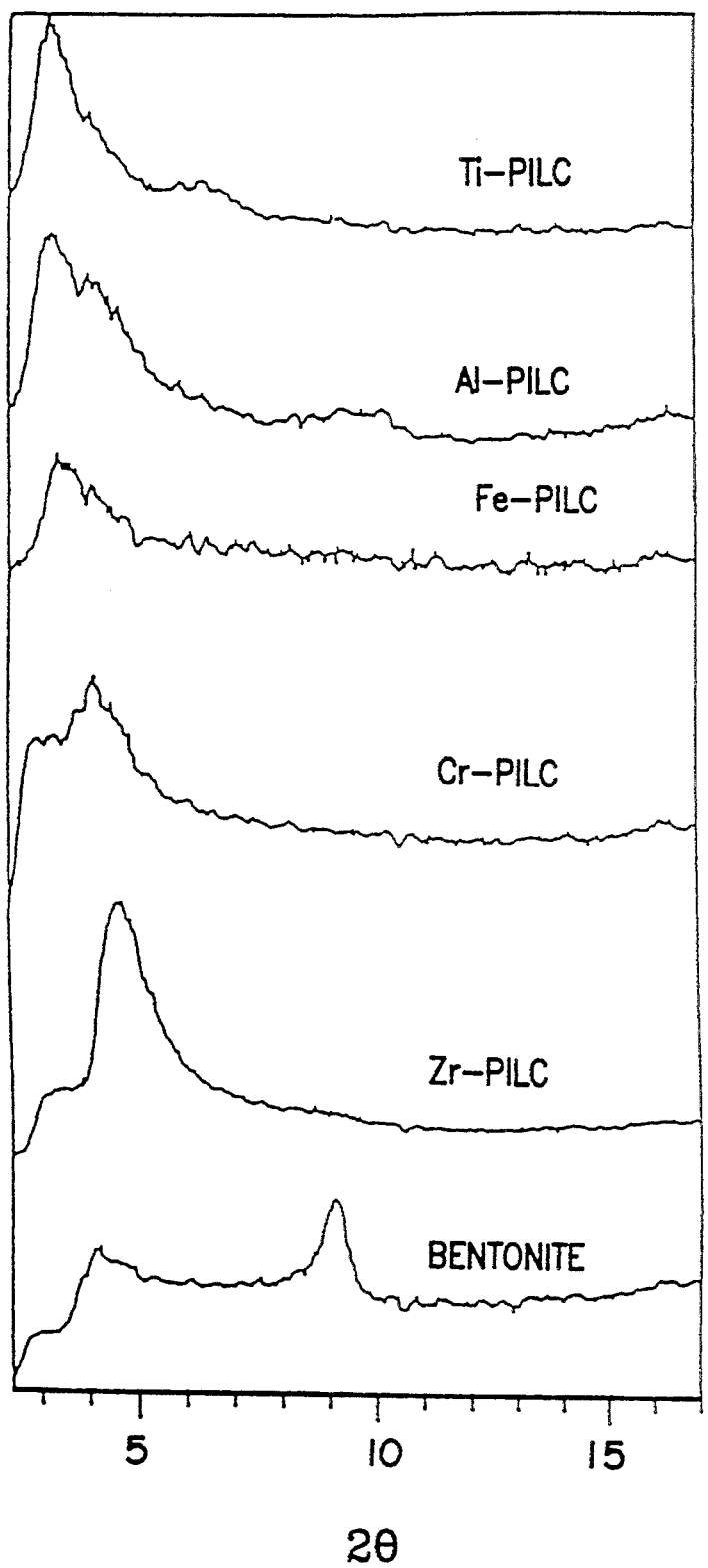
FIG. 2 shows X-ray diffraction powder patterns (Cu K$\alpha$ source) for pillared clays and starting bentonite clay.
Figure 3:
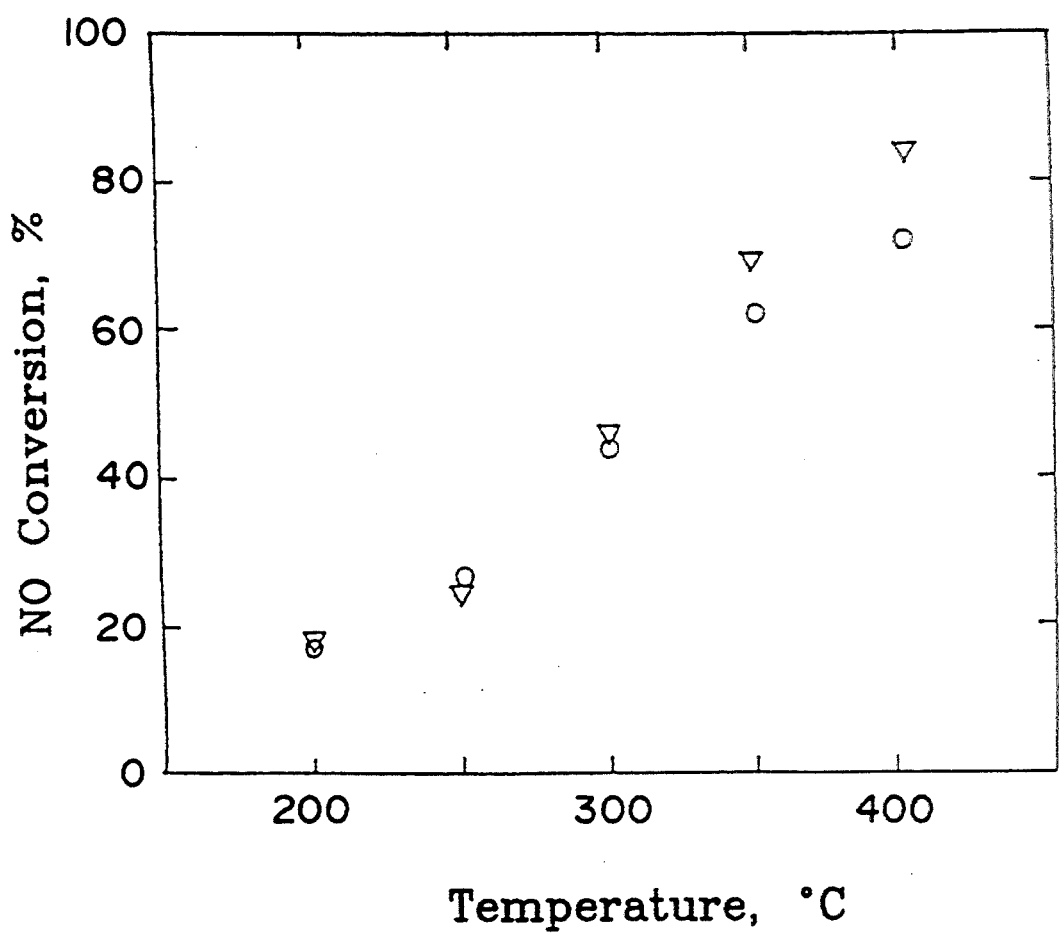
FIG. 3 shows a graph of NO conversion with $Fe_2O_3$-PILC catalyst with $SO_2$ ($\Delta$) and without $SO_2$ (o) in the feed.

X-ray powder diffraction patterns, using Cu Kα source, were obtained for the PILC samples, and are shown in FIG. 2. The interlayer spacings are listed in Table 1. The free interlayer spacings (calculated by subtracting the layer thickness of 9.6 Å for the clay from the $d_{001}$ spacings listed in Table 1) were between 10 and 19 Å. The limiting pore sizes may be the interpillar spacings rather than the interlayer spacings. Further studies of the micropore size distribution (PSD) in the five PILCs showed that the interlayer spacings was indeed the limiting size for all PILCs. For example, the smallest PSDs were for Zr-PILC and Cr-PILC, which had interpillar spacings in the range of approximately 4–8 Å, while Fe-PILC and Ti-PILC had the largest PSDs, approximately 9 Å. These pore sizes are large for the SCR reactant molecules (NH₃, NO and O₂) and product molecules (H₂O and N₂) in which to diffuse without causing severe mass transfer limitations in the SCR reaction. These pores, however, are too small for poisons such as As₂O₃. The pillared clay samples were in the form of strong agglomerates (approximately 1 mm in size) composed of crystals nearly 2 μm in size.

The BET surface areas (N₂, 77K) were measured with a Quantasorb instrument and are also listed in Table 1. The samples were purged in N₂ at 200° C. before the measurements. These surface areas are considerably higher than those of the SCR catalysts with TiO₂ support. For comparison, the surface areas of both 5% V₂O₅/TiO₂ and the commercial catalyst 8.2% WO₃ 4.8% V₂O₅/TiO₂ were approximately 30 m²/g. The commercial catalyst was prepared in the present inventors laboratory but had the same composition and surface area as the VTT catalyst.

TABLE 1

| Interlayer spacings and BET surface areas of pillared clays and the starting clay | | |
|---|---|---|
| Material | $d_{001}$ (Angstoms) | Surface Area (m²/g) |
| Bentonite | 9.6 | 25 |
| Zr-PILC | 19.3 | 321 |
| Cr-PILC | 21.7 | 303 |
| Fe-PILC | 26.4 | 217 |
| Al-PILC | 27.5 | 245 |
| TiPILC | 28.3 | 258 |

NO Conversion vs. Temperature

The SCR activities for the pillared clay catalysts were measured at different temperatures in the range 200°–450° C. The reactant gas composition was the same for all measurements: NO = NH₃ = 1,000 ppm; O₂ = 2%; N₂ = balance; SO₂ = 1,000 ppm (when used); and H₂O = 8% (when used). In the experiments, the catalyst sample was heated in the reactor in a flow containing only NO and NH₃, 1000 ppm each. For samples calcined at 200° C., the further heating in NH₃ (to the reaction temperature) could be significant in the SCR activity because such a treatment may increase (recover) the Bronsted acidity.

With the exception of Cr₂O₃-PILC, the NO conversion increased monotonically with temperature (to 450°

C.). The activity of $Cr_2O_3$-PILC peaked at 400° C. This temperature dependence is different from the $V_2O_5$ catalysts which decline at temperatures above 400° C., due to the activity for $NH_3$ oxidation at high temperatures. Thus, the pillared clays (except $Cr_2O_3$-PILC) did not exhibit activities for $NH_3$ oxidation in the temperature range tested, and this lack of $NH_3$ oxidation activity is a desirable property.

The NO conversion/temperature results are shown in FIG. 2, for the $Fe_2O_3$-PILC. The effect of $SO_2$ in the gas phase on the NO conversion varied among the pillared clays.

Comparison of Different Pillared Clays and Vanadia Catalyst

The SCR activities for different pillared clays are compared at 400° C. which is the representative commercial SCR temperature. The comparisons, along with $V_2O_5/TiO_2$ and $WO_3$-$V_2O_5/TiO_2$, are summarized in Table 2.

The activities in Table 2 are expressed in terms of first-order rate constants. The $V_2O_5/TiO_2$ catalyst and the commercial catalyst, $WO_3$-$V_2O_5/TiO_2$ are also included for comparison. The $Cr_2O_3$-PILC catalyst exhibited a higher activity than the commercial catalyst. However, addition of $SO_2$ decreased its activity. $Fe_2O_3$-PILC showed a high activity and also showed no $SO_2$ poisoning effect. The activity of the $Fe_2O_3$-PILC was comparable to the $V_2O_5/TiO_2$ catalyst.

Figure 4:
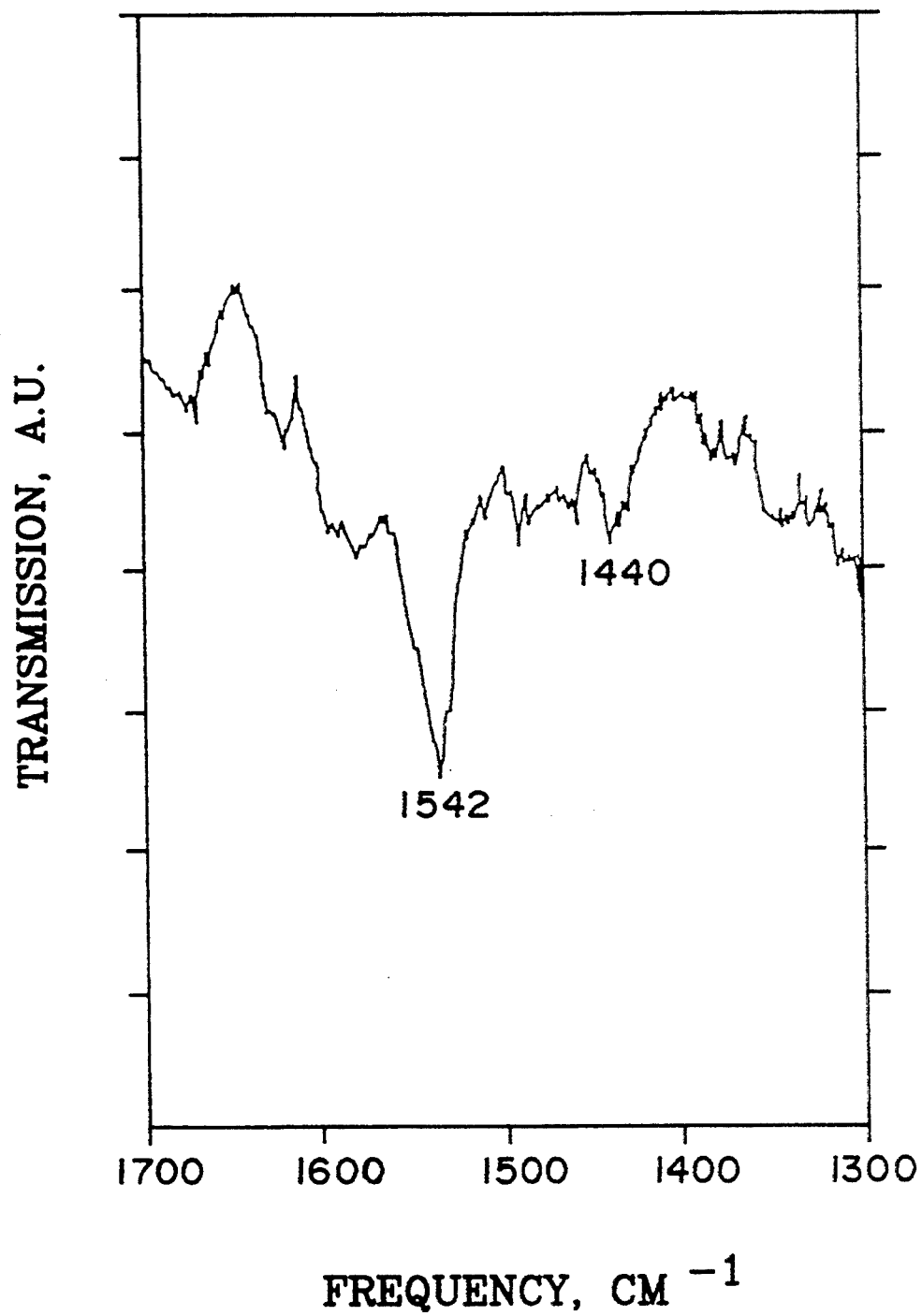
FIG. 4 shows the infrared spectrum for pyridine chemisorbed on $Fe_2O_3$-PILC.

Since $Fe_2O_3$-PILC is a promising SCR catalyst, a further understanding of its activity is desirable. The IR spectrum of the pyridine chemisorbed on this catalyst is shown in FIG. 4. The catalyst was exposed to pyridine (carried in $N_2$ flow) at 150° C. and the spectrum was measured at room temperature. The absorption band at 1,542 $cm^{-1}$ was apparently due to pyridinium on Bronsted acid sites whereas the band at 1,440 $cm^{-1}$ was apparently due to the Lewis acid sites. The relatively strong band at 1,542 $cm^{-1}$ was consistent with the correlation between SCR activity and the Bronsted acidity.

TABLE 2

Comparison of SCR activities at 400° C. in terms of the first-order constant, k, in $cm^3/g/s$.
($SO_2$ = 1,000 ppm for other conditions, see FIG. 2 caption.)

| Catalyst | k, no $SO_2$ | k, with $SO_2$ |
|---|---|---|
| $Cr_2O_3$-PILC | 13.8 | 2.74 |
| $Fe_2O_3$-PILC | 6.74 | 6.70 |
| $TiO_2$-PILC | 2.25 | 3.34 |
| $ZrO_2$-PILC | 1.68 | 2.60 |
| $Al_2O_3$-PILC | .47 | 0.47 |
| $V_2O_5/TiO_2$ | 7.70 | 7.70 |
| $WO_3$—$V_2O_5/TiO_2$ | 13.58 | 13.58 |

Promoting Effect of $CeO_2$ (or $Ce_2O_3$)

The effects of doping with $CeO_2$ (or $Ce_2O_3$) (the exact oxidation state of the dopant, and thus whether the dopant is $CeO_2$ or $Ce_2O_3$ or some combination of the two, was not known) in pillared clays were studied with $TiO_2$-PILC and $Fe_2O_3$-PILC, two of the more preferred PILC catalysts of the present invention.

The $CeO_2$ (or $Ce_2O_3$) doping was performed by incipient wetness impregnation using $Ce(NO_3)_3$ aqueous solutions. The impregnated samples were dried at 60° C. followed by heating at 100° C. for 1 hour and 400° C. for 18 hours, all in air.

The SCR activities of the $CeO_2$ doped $TiO_2$-PILC samples expressed in % NO conversion are shown in Table 3. Due to the high calcination temperature of 400° C., the SCR rate constant of the sample without $CeO_2$ (or $Ce_2O_3$) doping was actually slightly decreased from that shown in Table 2 (which was calcined at 300° C.).

TABLE 3

Promoting effect of $CeO_2$ on SCR activity of $TiO_2$-PILC, expressed by NO conversion (%) under standard reaction conditions with both $SO_2$ and $H_2O$.

| Catalyst | % Conversion at temperature (degrees Celsius) | | |
|---|---|---|---|
| | 350 | 400 | 450 |
| $TiO_2$-PILC (A) | 54.5 | 71.5 | 85.0 |
| .5% $CeO_2$ on A | 59.0 | 86.0 | 95.2 |
| 1.0% $CeO_2$ on A | 70.5 | 90.0 | |
| 1.5% $CeO_2$ on A | 69.5 | 89.5 | 96.5 |

The promoting effect of $CeO_2$ (or $Ce_2O_3$) on the activity of $Fe_2O_3$-PILC was studied more extensively, covering the temperature range of 150°–500° C. Strong promoting effects were observed at all temperatures, and the effects at 400° C. are shown in Table 4.

TABLE 4

Promoting effect of $CeO_2$ on SCR activity of $FeO_2$-PILC, expressed by rate constant k, at 400° C. under standard conditions.

| Catalyst | k at 400 degrees C., $cm^3/g/s$ | |
|---|---|---|
| | Without $SO_2$ | With $SO_2$ |
| $Fe_2O_3$-PILC | 6.74 | 6.70 |
| .5% $CeO_2$ on B | 7.22 | — |
| 1.0% $CeO_2$ on B | 10.15 | 11.80 |
| 1.5% $CeO_2$ on B | 16.25 | 14.71 |
| 2.0% $CeO_2$ on B | 15.43 | 16.70 |

The results in Tables 3 and 4 clearly demonstrate the strong promoting effects of $CeO_2$ (or $Ce_2O_3$) on the SCR activity. It is also clear that the promoted catalysts are $SO_2$-resistant. For both $TiO_2$ and $Fe_2O_3$ pillared clays, there was an optimal amount of $CeO_2$ doping, beyond which the activity decreased. This was apparently caused by pore plugging beyond the optimal doping amount. The effective amount of $CeO_2$ (or $Ce_2O_3$) dopant is between approximately 0.1 and 10 wt %. The optimal and preferred $CeO_2$ (or $Ce_2O_3$) dopant amount is approximately 1 wt % for $TiO_2$-PILC and 1.5-4.0 wt % and more preferably 3 wt % for $Fe_2O_3$-PILC. The most significant result was that the promoting effect was a strong one, and that for $Fe_2O_3$-PILC, the promoted catalyst was more active than the VTT commercial catalyst.

The preparation conditions for catalyst preparation, such as temperature and gaseous environment for PILC calcination and dopant type and amount can be optimized. The effective temperature range for catalyst preparation is 0° to 80° C. with room temperature being the preferred preparation temperature since any heating and cooling steps will be minimized. The preferred embodiment pillared clays have substantially higher SCR activities (twice as high in some cases) than the commercial catalysts. Taken together with the improved poison resistance due to the bimodal pore size distribution discussed earlier, the pillared clays are expected to be superior to the commercial $V_2O_5$-based SCR catalysts. The pillared clay catalysts should also be substantially less expensive to produce since no expensive materials will be required (such as expensive vanadium or expensive noble metals). The present invention requires only the use of clay and inexpensive and relatively abundant materials such as Fe₂O₃ or TiO₂ (plus any optional dopants) and, as such, the catalysts should be much less expensive than the commercial V₂O₅ catalysts. Furthermore, very little if any SO₃ is formed even when using high sulfur coals with the PILC SCR catalysts of the present invention.

The gaseous environment for catalyst preparation can be air and/or inert gases. Preferably the catalysts can be prepared and calcined in a gaseous environment of room air so that the addition or removal of gaseous constituents will be unnecessary.

The intrinsic activity (expressed in rate constant k) of the Cr₂O₃-PILC was higher than both V₂O₅-based catalysts; it was decreased significantly, however, by the presence of SO₂. The activity of Fe₂O₃-PILC was not influenced by SO₂. With 1.5 wt % CeO₂ doped on the Fe₂O₃-PILC, the activity exceeded those of the V₂O₅-based catalysts.

Further testing with TiO₂-PILC doped with Fe₂O₃ and Cr₂O₃ was conducted. These two PILCs were chosen for further testing because the earlier results appeared to show these two as the most promising for use as catalysts for SCR.

The FeO₃-pillared clay and the TiO₂-pillared clay doped with Fe₂O₃ and Cr₂O₃ are the preferred pillared clays for use in the present invention.

The SCR activity is measured in terms of a first order rate constant k where $$\frac{-dC_{NO}}{dt} = kC_{NO}$$

is the first order rate equation. It is zero with respect to NH₃ and O₂. Therefore k is a direct measure of the catalyst activity ($C_{NO}$ is the concentration of NO, and t is time). The Fe₂O₃-PILC was found to be approximately equally active to a commercial catalyst it was compared with. The Fe₂O₃ and Cr₂O₃ doped TiO₂-PILC was about twice as active. CeO₂ can be used as the promoter for the catalysts. With 1% CeO₂, the activity of Fe₂O₃-PILC increases by from 10–40%. However, the 1% CeO₂ has no effect on the TiO₂-PILC.

TABLE 5

Comparison of the Rate Constants on delaminated Fe₂O₃-PILC

| Catalyst No. | −H₂O −SO₂ | +H₂O −SO₂ | −H₂O +SO₂ | +H₂O +SO₂ | NOTE |
|---|---|---|---|---|---|
| 1 | 15.4 | — | — | — | |
| 2 | 23–24 | 18–19 | — | — | same as #1 |
| 3 | 9.0 | — | — | — | calcined at 200° C. for 16 hr. |
| 4 | 23–26 | — | — | — | used immediately after drying at 120° C. for 16 hr. |
| 5 | 103.4 | 66 | — | 39.5 | Pillaring at 40° C. and dried at 120° C. for 16 hr. |

Reaction Conditions:
NO = NH₃ = 1,000 ppm, O₂ = 2%, N₂ balance
H₂O = 8% (when used)
SO₂ = 500 ppm (when used)

TABLE 6

Stability Test of TiO₂-PILC doped with 7.5% Fe₂O₃ and 2.5% Cr₂O₃.

| Temp (°C.) | Conditions | Time (hr) | NO Conv. (%) | k(cm³/g/s) |
|---|---|---|---|---|
| 350 | −H₂O, −SO₂ | 1.5 | 93.5 | 56.9 |
| | | 19.5 | 96 | 67 |
| | | 21 | 96.3 | 68.7 |
| | +H₂O, −SO₂ | 21.5 | 87 | 42.5 |
| | −H₂O, +SO₂ | 22 | 98.1 | 82.6 |
| | +H₂O, +SO₂ | 22.5 | 76 | 29.7 |
| | +H₂O, −SO₂ | 23 | 85.5 | 40.2 |
| | −H₂O, −SO₂ | 24 | 97.9 | 80.5 |
| 325 | −H₂O, −SO₂ | 26 | 92 | 52.6 |
| 375 | −H₂O, −SO₂ | 27 | 99.45 | 108.4 |
| | +H₂O, −SO₂ | 27.5 | 95 | 62.4 |
| | +H₂O, +SO₂ | 28 | 76 | 29.7 |
| | +H₂O, −SO₂ | 46 | 87 | 42.5 |
| 400 | −H₂O, −SO₂ | 47 | 99.3 | 103 |
| | +H₂O, −SO₂ | 48 | 95.8 | 66.0 |
| | +H₂O, +SO₂ | 49 | 85 | 39.5 |

TABLE 7

1st Order Rate Constant of TiO₂-PILC Catalyst With Various Ratios of Fe₂O₃ and Cr₂O₃.

| Reaction Condition Catalyst Sample | 1st Order Rate constant, k, cm3/g/s | |
|---|---|---|
| | −SO₂, −H₂O | +SO₂, +H₂O |
| 10% Fe₂O₃ | 83.2 | 41.0 |
| 7.5% Fe₂O₃ w/ 2.5% Cr₂O₃ | 140.7 | 88.4 |
| 5.0% Fe₂O₃ w/ 5.0% Cr₂O₃ | 107.6 | 82.1 |
| 2.5% Fe₂O₃ w/ 7.5% Cr₂O₃ | 70.0 | 40.3 |
| 10% Cr₂O₃ | 64.5 | 47.9 |
| A commercial Catalyst | 57.5 | 46.1 |

A Fe₂O₃-PILC was synthesized which was found to be "delaminated" because of the lack of reflection lines in XRD. The delaminated Fe₂O₃-PILC had very high SCR activity and exhibited high stability as shown in TABLE 8.

TABLE 8

| time on stream, hrs | NO Conversion, % | Rate constant, k |
|---|---|---|
| 0 | 91.5 | 53.8 |
| 24 | 91.2 | 53.3 |
| 48 | 91.5 | 53.8 |
| 72 | 92.0 | 55.4 |
| 96 | 91.5 | 53.8 |

SCR Conditions:
NH₃ = NO = 1,000 ppm;
SO₂ = 500 ppm;
H₂O = 8%;
O₂ = 2%;
N₂ = balance, T = 400° C.;
catalyst amount = 0.38 g;
total flow = 500 cc STP/min.

Thus the most preferred embodiment of the present invention, as described earlier, is an SCR catalyst formed of delaminated Fe₂O₃-PILC because of its high SCR activity and high stability. The delaminated Fe₂O₃-PILC alternatively and optionally can be doped with cesium oxide which slightly increases the activity of the delaminated Fe₂O₃-PILC. However, the slight increase in SCR activity may not, in many cases, justify the added cost of the relatively expensive cesium oxide dopant.

In conclusion the present invention provides a catalyst for the selective catalytic reduction of nitrogen oxides with ammonia comprising a catalyst base of a pillared clay composition. The pillared clay composition can have pillars consisting of an oxide of one of the following materials: Fe, Ti, Cr, Al, or Zr. The catalyst can be calcined. The pillared clay composition can be delaminated $Fe_2O_3$. Alternatively, the pillared clay composition can be $TiO_2$-PILC doped first with an effective amount of $Fe_2O_3$ and second with an effective amount of $CrO_3$. The effective and preferred amount of $Fe_2O_3$ is approximately 5 wt % $Fe_2O_3$ and the effective and preferred amount of $Cr_2O_3$ is approximately 5 wt % $Cr_2O_3$.

The catalyst can have a pillared clay composition of $Fe_2O_3$-PILC to which $CeO_2$ or $Ce_2O_3$ can be added in an effective amount as a promoter. The effective range of the amounts of $CeO_2$ or $Ce_2O_3$ used as a promoter is between 0.1 and 10 wt % and more preferably approximately 3 wt %.

The catalyst can have a bimodal pore distribution to provide increased surface area for reaction and increased poison resistance.

The present invention also provides a process for the selective catalytic reduction of nitrogen oxides with ammonia comprising mixing nitrogen oxide containing gas with ammonia gas and bringing the mixture gas into contact with a catalyst which comprises a catalyst base of a pillared clay composition. The process of the SCR can use a pillared clay composition having pillars consisting of an oxide of one of the following materials: Fe, Ti, Cr, Al, or Zr. The process of can also utilize a pillared clay composition which is calcinated. The process can create a bimodal pore distribution in said catalyst providing increased surface area for reaction and increased poison resistance. The process can be used for reducing nitrogen oxides emissions from coal fired or heavy oil fired boilers or heating furnaces employing fuels with high sulfur content.

The present invention also provides a process for preparing a catalyst for use in the selective catalytic reduction of nitrogen oxides with ammonia comprising:

exchanging the charge compensating cations of a layered clay with inorganic hydroxycations;

heating such that said inorganic hydroxycations undergo dehydration and dehydroxylation;

whereby clusters of stable metal oxides or salts act as pillars separating the clay layers separated.

The process of preparing the catalyst can utilize pillars selected from one or more of the following: oxides of titanium, oxides of zirconium, oxides of aluminum, oxides of iron, or oxides of chromium.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A process for the selective catalytic reduction of nitrogen oxides with ammonia comprising mixing nitrogen oxide containing gas with ammonia gas and bringing the mixture gas into contact with a catalyst which comprises a catalyst base of a pillared interlayered clay composition;

said pillared interlayered clay composition comprised of: an effective amount of a clay material selected from one or more of the group consisting of phyllosilicates, pyrophillates, talcs, bentonite and any other clay effective for forming pillared interlayered clay; and one or more metals utilized as the pillars, said one or more metals selected from the group consisting of Fe, Ti, Cr, Al, and Zr.

2. The process of claim 1 wherein said effective amount of a clay material in said catalyst base is 1 gram of clay for at least every approximately 1.0 mmole of metal.

3. The process of claim 2 wherein said pillared interlayered clay is a delaminated $Fe_2O_3$-PILC.

4. The process of claim 2 wherein said pillared interlayered clay composition is a $TiO_2$-PILC doped first with an effective amount of $Fe_3O_3$ and second with an effective amount of $Cr_2O_3$.

5. The process of claim 4 wherein said effective amount of $Fe_2O_3$ is approximately 5 Wt % $Fe_2O_3$ and said effective amount of $CF_2O_3$ is approximately 5 wt % $Cr_2O_3$.

6. The process of claim 5 wherein an effective amount of $CeO_2$ and/or $Ce_2O_3$ is used as a promoter.

7. The process of claim 6 wherein said effective amount of $CeO_2$ and/or $Ce_2O_3$ is between approximately 0.1 and 10 wt %.

8. The process of claim 7 wherein said between 0.1 and 10 wt % is approximately 3 wt %.

9. The process of claim 1 wherein said pillared clay composition is calcined.

10. The process of claim 9 wherein a bimodal pore distribution is created in said catalyst providing increased surface area for reaction and increased poison resistance.

11. The process of claim 10 wherein said process is used for reducing nitrogen oxides emissions from coal fired or heavy oil fired boilers or heating furnaces employing fuels with high sulfur content.

* * * * *